UNITED STATES PATENT OFFICE 2,467,192

COATING COMPOSITIONS

Martin E. Cupery, Wilmington, Del., assignor to E. I. du Pont de Nemours & Company, Wilmington, Del., a corporation of Delaware No Drawing. Application April 5, 1946, Serial No. 659,877

3 Claims. (Cl. 106—178)

This invention relates to film-forming compositions and processes for producing articles therefrom. More particularly this invention relates to coating compositions containing novel dispersing agents and methods for treating articles to form water-insensitive surfaces.

Heretofore, numerous water-dispersed compositions have been used for finishing textiles, metals, paper, masonry and the like. Although the use of such water-dispersed compositions has greatly increased during recent years, such coatings are deficient in that they are adversely affected upon contact with water. Prior to the present invention such dispersions have been made employing dispersing agents which retain their water-sensitivity in the dry film. Therefore, they have not been entirely satisfactory because the dry coating is not truly water-insensitive.

This invention has an object to provide film-forming compositions containing novel dispersing agents. A further object is to provide methods for treating articles with aqueous dispersions employing novel dispersing agents. A still further object is to provide a novel method for producing articles from aqueous dispersions employing dispersing agents which can be readily inactivated and which do not contribute water-sensitivity to the articles. An additional object is to provide a method for treating surfaces with aqueous dispersions comprising as a dispersed phase a film-forming material and as the dispersing agent a water-soluble ammonium salt of an amic acid which is readily rendered water-insoluble and hence inactivated as a dispersing agent. Another object is to provide water repellent films and coatings. Other objects will appear hereinafter.

These objects are accomplished by providing aqueous compositions containing the water-soluble ammonium salts of certain monoalkyl N-substituted amic acids. It has now been discovered that water-soluble ammonium salts of monoalkyl N-substituted dicarboxylic amic acids in which the two non-oxo-carbonyl groups are attached to adjacent carbon atoms can be used to prepare excellent aqueous dispersions and that films deposited from these dispersions, after inactivation of the amic acid dispersing agent, are remarkably water-insensitive. Articles having superior repellency to water are formed by contacting the article with a dispersion containing, as the dispersing agent, the water-soluble ammonium salt of an N-monoalkyl dicarboxylic amic acid, drying the treated article and then subjecting the article to conditions conducive to the inactivation of the amic acid ammonium salt dispersing agent by conversion to its water-insoluble form.

In the application of the dispersions of this invention, the material is treated with the dispersion and the treated material allowed to stand either at room temperature until the water has completely evaporated or baked at temperatures preferably below 250° C. The resulting treated article is thereby rendered water-insensitive. The dispersing agents of this invention thus possess the transitory property of being water-soluble and forming stable dispersions until deposited in films and air dried or baked when they lose their water solubility and become water insoluble. The term aqueous dispersion includes dispersion in aqueous solutions, such as ammonium hydroxide.

The preferred dispersions for use in the practice of this invention are those which contain as the dispersing agent the ammonium salt of a long chain monoalkyl N-substituted amic acid. Particularly preferred are dispersions containing the ammonium salt of a monoalkyl N-substituted amic acid derived from bicyclo[2,2,1]-5-heptene-2,3-dicarboxylic anhydride because of the ease with which it is inactivated. The bicyclo[2,2,1]-5-heptene-2,3-dicarboxylic anhydride is made by condensing one mole of maleic anhydride with one mole of cyclopentadiene as described in U. S. Patent No. 1,944,731 issued January 23, 1934. In place of this particular dicarboxylic acid anhydride there can be used other dicarboxylic acid anhydrides obtained by condensing maleic anhydride with other organic compounds containing a system of conjugated double bonds capable of 1,4 addition, as described in U. S. Patent No. 1,944,731. An example of such other dicarboxylic acid anhydride is cis-$\Delta^4$-tetra-hydro-orthophthalic anhydride.

The monoalkyl N-substituted dicarboxylic amic acid ammonium salts used in the practice of this invention may be classed into two general groups, namely, those derived from dicarboxylic acid anhydrides in which the non-oxo carbonyl groups are attached directly to adjacent carbon atoms which are part of a cyclic system and those derived from dicarboxylic anhydrides in which the non-oxo carbonyl groups are directly attached to adjacent acyclic carbon atoms. Examples of acid anhydrides of the first class are bicyclo-[2,2,1]-5-heptene-2,3-dicarboxylic anhydride, phthalic anhydride, chlorophthalic anhydride, naphthalene dicarboxylic anhydride, hexahydrophthalic anhydride, and quinolinic anhydride. Examples of the second class are succinic anhydride, phenyl succinic anhydride, tolyl succinic anhydride, xylyl succinic anhydride, methyl succinic anhydride, ethyl succinic anhydride, octyl succinic anhydride, decyl succinic anhydride, tetradecyl succinic anhydride, chlorosuccinic anhydride, itaconic anhydride, maleic anhydride, and the like.

The amic acid ammonium salts can be made by partially or completely dissolving the dicarboxylic acid anhydride in an organic solvent, such as benzene, adding to the suspension or solution thus obtained with stirring, the desired primary alkyl amine, and then treating the suspension or solution of the resulting amic acid with ammonia until the ammonium salt is formed. Ammonia can be passed into the solution or suspension of the amic acid in an organic solvent or the amic acid can be dissolved in dilute ammonium hydroxide to form the amic acid ammonium salt dispersing agent.

The amount of primary alkyl amine used in the amidation is that required to react with one of the carboxyl groups of the dicarboxylic acid anhydride. In mole proportions, this means one mole of the primary alkyl amine per mole equivalent of the dicarboxylic acid. For best results the amidation of the dicarboxylic acid anhydride is carried out with an equimolar mixture of long chain primary alkyl amine and a short chain primary alkyl amine.

By "long chain primary alkyl amine" is meant that the alkyl amine has the general formula $RNH_2$ in which R is an alkyl radical containing more than 7 carbon atoms. Examples of such long chain primary alkyl amines are octyl amine, decyl amine, dodecyl amine, tetradecyl amine, hexadecyl amine, octadecyl amine and the mixture of amines obtained by the carboxyl reduction in the presence of ammonia, of oils and fats such as coconut oil, stearin, and the like.

By "short chain primary alkyl amine" is meant that the alkyl amine has the general formula $RNH_2$ in which R is an alkyl radical containing less than 7 carbon atoms. Examples of such short chain primary alkyl amines are methyl amine, ethyl amine, propyl amine, butyl amine and amyl amine.

Through employment of the monoalkyl N-substituted amic acid ammonium salts, aqueous dispersions which are stable can be made and which contain up to 75% or more total solids. The exact method for preparing these dispersions will vary to some extent depending upon the material being dispersed. If the material to be dispersed is liquid, the best way of preparing the dispersion is to add it to an aqueous solution of the monoalkyl N-substituted amic acid ammonium salt. If the material to be dispersed is a solid, it is best to blend it with the monoalkyl N-substituted amic acid ammonium salt and then to reduce the blend with water to the desired solids concentration. In such instances it may be desirable to heat the material which is to be dispersed and add it with stirring to a solution of the monoalkyl N-substituted amic acid in dilute aqueous ammonium hydroxide. Obviously other methods known to the art can be used in preparing the dispersion.

In the application of the amic acid ammonium salt dispersing agents the amount which is effective will vary from about 2 to about 30% on the weight of the material being dispersed. As a rule, the amount is in the range of from 5 to 15%, but the particular amount will vary to some extent depending upon the material being dispersed.

The particular conditions required for the inactivation of the monoalkyl N-substituted amic acid ammonium salt dispersing agents depend upon the particular amic acid used. Thus, long chain monoalkyl N-substituted amic acid ammonium salts obtained from bicyclo[2,2,1]-5-heptene-2,3-dicarboxylic anhydride inactivate readily upon standing at ordinary temperatures for several days and more rapidly when heated at temperatures of from 60° to 100° C. Although long chain monoalkyl N-substituted amic acid ammonium salts from succinic and phthalic acids require elevated temperatures of from 100° to 250° C. for rapid inactivation, these amic acid dispersing agents inactivate at lower temperatures over a longer period of time.

This invention is further illustrated by the following examples in which the amounts are expressed in parts by weight, unless otherwise specified.

*Example 1*

A mixture of 8 parts of the N-octadecyl monoamide of bicyclo[2,2,1]-5-heptene-2,3-dicarboxylic acid and 12 parts of potassium persulfate is placed in 345 parts of water and after raising the temperature to 45° C. the pH of the mixture is adjusted to 10.1 with concentrated ammonium hydroxide. A mixture of 200 parts of chloro-2-butadiene-1,3 and 14 parts of sulfur is added and emulsified by vigorous agitation in an atmosphere of nitrogen. The temperature of the emulsion is adjusted to 40° C. and maintained at this temperature (±1° C.) while stirring continuously. When the specific gravity has become constant at 1.063, heating is discontinued. This occurs after 128 minutes. The resulting dispersion is compounded into a formulation of the following composition:

| | Parts |
|---|---|
| Dispersion prepared as above | 113 |
| 50% aqueous dispersion of a hard clay | 7.2 |
| 50% aqueous dispersion of a phenyl-beta-naphthyl-amine | 1.47 |
| 50% aqueous dispersion of zinc oxide | 3.6 |
| Sodium silicate | 0.45 |

Test films of the resulting composition are prepared by immersing a porous porcelain cup 100 mm. high and 52 mm. inside diameter, with the open end fitted with a two-hole rubber stopper (one hole plugged to apply suction) in 1% ammonium hydroxide solution and applying suction for 1 minute. The cup is removed, excess ammonium hydroxide clinging to it is blown off and then immersed in the dispersion prepared as described above for 30 minutes with the suction applied. This immersion is accomplished by placing the porous cup in such a way that a beaker containing the dispersion can be placed under it and raised so that the latex in the beaker will cover the cup. At the end of the immersion time, the beaker is lowered and the cup is tipped slightly off the perpendicular to allow excess dispersion clinging to it to drain off. The cup is then inverted and the liquid in it released by momentary removal of the plug after which it is left with the suction on until the film is dry. Usually this requires about 4 hours. The film is then removed from the cup by splitting it up one side and around the bottom and peeling it off gently. The film thus obtained is cured in an oven at 140° C. for 16 minutes. The volume increase in the film, prepared as described above, measured after 48 hours' immersion in water at 100° C., is 42% compared with 60.5% obtained with polychloroprene prepared employing sodium resinate as the dispersing agent and compounded as above.

Example II

Twenty parts of a soya bean oil modified alkyd resin (containing 60% soya bean oil) and containing 0.05% cobalt metal drier (as cobalt naphthenate) based on the soya bean oil, is emulsified by adding to it gradually with strong agitation 30 parts of a 2% aqueous solution of the ammonium salt of the N-dodecyl monoamide of bicyclo[2,2,1]-5-heptene-2,3-dicarboxylic anhydride, adjusted to an alkalinity corresponding to a pH of about 9.5. A smooth, uniform dispersion results which shows only gradual creaming on standing for several days, but without showing any evidence of coagulation or breakage. Such dispersions are readily brushed on wood, ceramic, or paper substrates and the films obtained on drying for several days at room temperature or on baking are clear, smooth, and have excellent resistance to water. When similar dispersions are made from ordinary dispersing agents, such as sodium dodecyl sulfate or sulfonated mineral oils, the coatings obtained dry more slowly and soften and discolor severely upon contact with water.

Example III

An alkaline (pH 8.8) 1% aqueous solution of the ammonium salt of the N-dodecyl monoamide of bicyclo[2,2,1]-5-heptene-2,3-dicarboxylic anhydride is rapidly heated to 70° C. and to the solution is added with strong agitation 10% by weight of paraffin wax heated to 70° C. The dispersion which forms is rapidly cooled to room temperature while stirring. The dispersion is readily applied to fabric and paper substrates.

On air drying or short baking treatments (110° C. for three minutes) coatings are obtained which show a high degree of repellency to water.

An alternative procedure for making the above dispersion is to dissolve the amic acid in the molten paraffin wax at 70 to 80° C. and reduce the composition with water by pouring it slowly with continuous, vigorous stirring into dilute aqueous ammonium hydroxide heated to 70° C.

Example IV

To 22.6 parts of the mixed alkylene succinic anhydride having an average molecular weight of about 113, prepared as described in U. S. Patent 2,055,456, issued Sept. 22, 1936, and which contains about equal proportions of 8 to 10 carbon atom alkylene groups, is added portionwise, with stirring and cooling, a solution of 18.5 parts of n-dodecylamine dissolved in 100 cc. of benzene. The clear solution which results is allowed to stand overnight. Upon evaporation of the benzene, under reduced pressure, a pale yellow oil remains which is soluble in dilute ammonium hydroxide. The product is also soluble in hydrocarbons and fatty oils and when such solutions are poured with stirring into dilute aqueous ammonium hydroxide, dispersions of excellent stability result. Films having a high degree of water resistance are obtained upon air-drying from emulsified drying oils, prepared as described above, and which contain metallic driers.

Example V

To 60 parts of an alkyd resin composition comprising 55 parts of a 60% linseed oil modified glyceryl phthalate resin, 44 parts of an aromatic naphtha varnish solvent (B. P. 80–120° C.), and 1 part of a 2% cobalt naphthenate solution, in aromatic naphtha (B. P. 80–120° C.) heated to 70° C., is added with rapid stirring 40 parts of a 0.5% solution of N-dodecylphthalamic acid dissolved in dilute ammonium hydroxide at pH 8.5. A finely divided emulsion of the resin is formed. The emulsion has desirable false-body characteristics so that it may be smoothly brushed over fabrics, paper, wood or ceramic surfaces. Upon air drying for 24 to 48 hours, continuous, smooth, clear coatings result which have excellent resistance to prolonged exposure to water (2–20 hrs.) at ordinary temperatures. Baked coatings (100° C./1 hour, 70° C./16 hours) show excellent resistance to water at 70–80° C.

A corresponding emulsion prepared with an equal amount of dodecyl sodium sulfate in place of N-laurylphthalamic acid in the above example, has poor brushing characteristics and the air dried and baked films have inferior resistance to water. Such dried films prepared with dodecyl sodium sulfate when left in contact with water show excessive swelling and discoloration. Moreover, the white discoloration produced by water (water spotting) remains to some extent when the film is again dried. In these and other respects such films are inferior to those obtained from emulsions based on the amic acid dispersing agents of this invention.

Materials which can be dispersed satisfactorily in water by the use of the monoalkyl N-substituted amic acid ammonium salts of this invention include drying, semi-drying and nondrying oils, for example, linseed oil, China-wood oil, oiticica oil and corn oil; oil modified polyhydric alcohol-polycarboxylic acid resins; natural and synthetic waxes, for example, paraffin waxes, carnauba wax, beeswax, and ceresin; synthetic polymers, such as polyethylenes, polyisobutylenes, polyamides, polyvinyl acetate, polyvinyl chloride, polyvinylidene fluoride, polymethyl methacrylate, polymethyl acrylate, and vinyl acetate/vinyl chloride polymers; natural and synthetic rubbers, such as rubber, gutta percha, balata, butadiene/styrene polymers, butadiene/acrylonitrile polymers, and butadiene/methyl methacrylate polymers; modified natural polymers, for example, cellulose nitrate, cellulose acetate, ethyl cellulose, and crotyl cellulose; natural and synthetic asphalts; pigments, for example, titanium oxide and iron oxide; water-insoluble dyes and lakes; sulfur, phenothiazine, p,p-dichlorodiphenyl trichloroethane and other water-insoluble fungicidal and bactericidal compounds.

The dispersions of these materials with the monoalkyl N-substituted amic acid ammonium salts of this invention can be made through the use of internal mixing equipment, such as Banbury and Werner-Pfleiderer mixers, colloid and ball mills, lightning type mixers and by other apparatus suitable for such purpose.

The dispersions used in the practice of this invention, because of their ability to deposit films upon drying which are water-insensitive, are useful as protective and decorative coatings for all sorts of surfaces. Through the use of the transitory dispersing agents of this invention, it is possible to prepare aqueous dispersions from which films can be deposited which are remarkably resistant to washing after standing in the air for several days or after baking at moderate temperatures.

As many apparently widely different embodiments of this invention may be made without departing from the spirit and scope thereof, it is to be understood that I do not limit myself to the specific embodiments thereof except as defined in the appended claims.

I claim:

1. A coating composition consisting of an aqueous dispersion of at least one dispersible material and the ammonium salt of a long-chain monoalkyl N-substituted amide of bicyclo [2,2,1]-5-heptene-2,3-dicarboxylic acid.

2. A coating composition consisting of an aqueous dispersion of at least one dispersible material and the ammonium salt of the N-octadecyl monoamide of bicyclo [2,2,1]-5-heptene-2,3-dicarboxylic acid.

3. A coating composition consisting of an aqueous dispersion of at least one dispersible material and the ammonium salt of the N-dodecyl monoamide of bicyclo [2,2,1]-5-heptene-2,3-dicarboxylic acid.

MARTIN E. CUPERY.

REFERENCES CITED

The following references are of record in the file of this patent:

UNITED STATES PATENTS

| Number | Name | Date |
| --- | --- | --- |
| 2,101,323 | Salzberg | Dec. 7, 1937 |

FOREIGN PATENTS

| Number | Country | Date |
| --- | --- | --- |
| 557,774 | Great Britain | Dec. 6, 1943 |

OTHER REFERENCES

Morgan et al.: "Jour. Am. Chem. Soc.," 66, 404–7 (1944).